Oct. 25, 1932.  J. L. ANDERSON  1,884,960
UNIVERSAL TORCH MACHINE
Filed Feb. 11, 1932   2 Sheets-Sheet 1
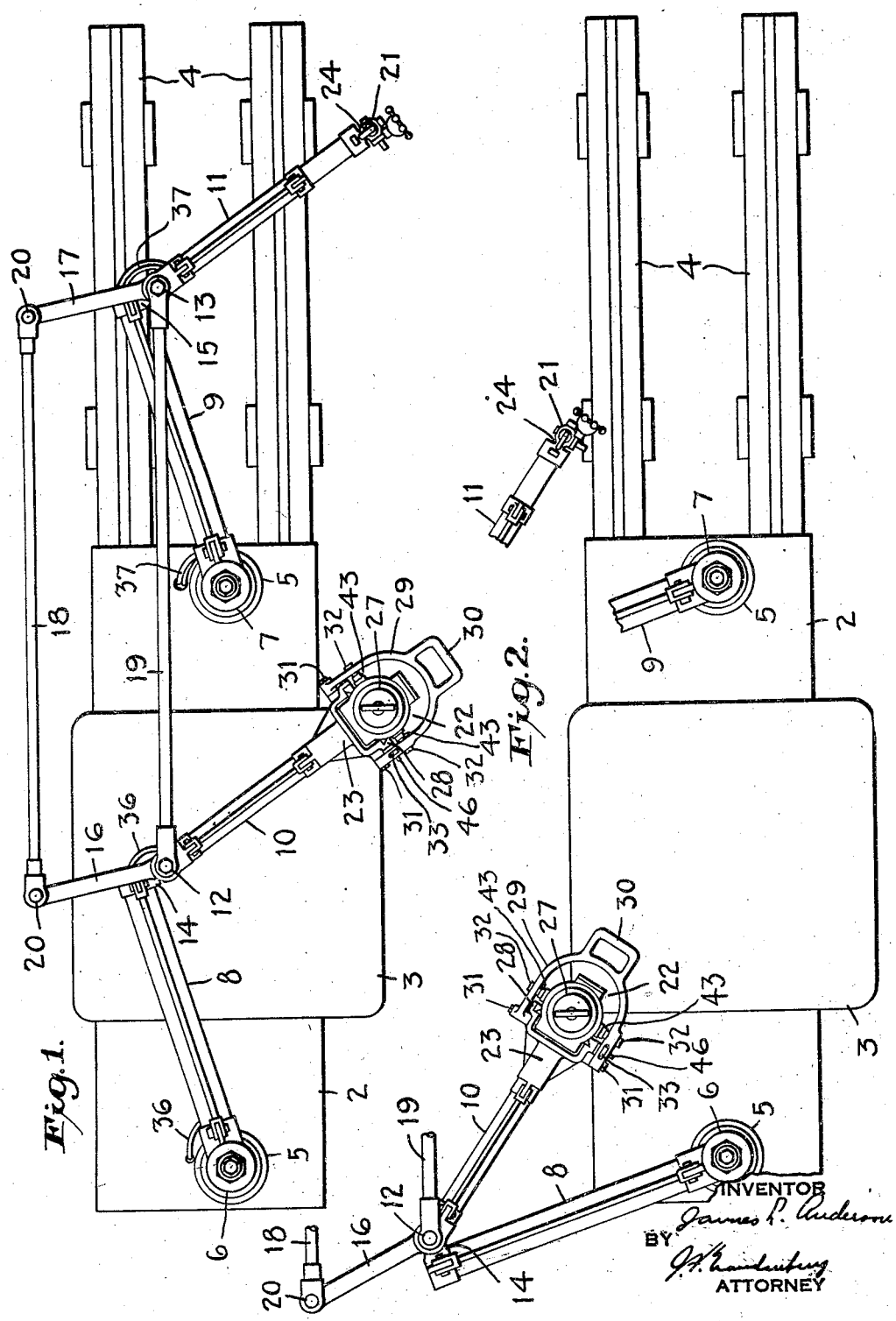

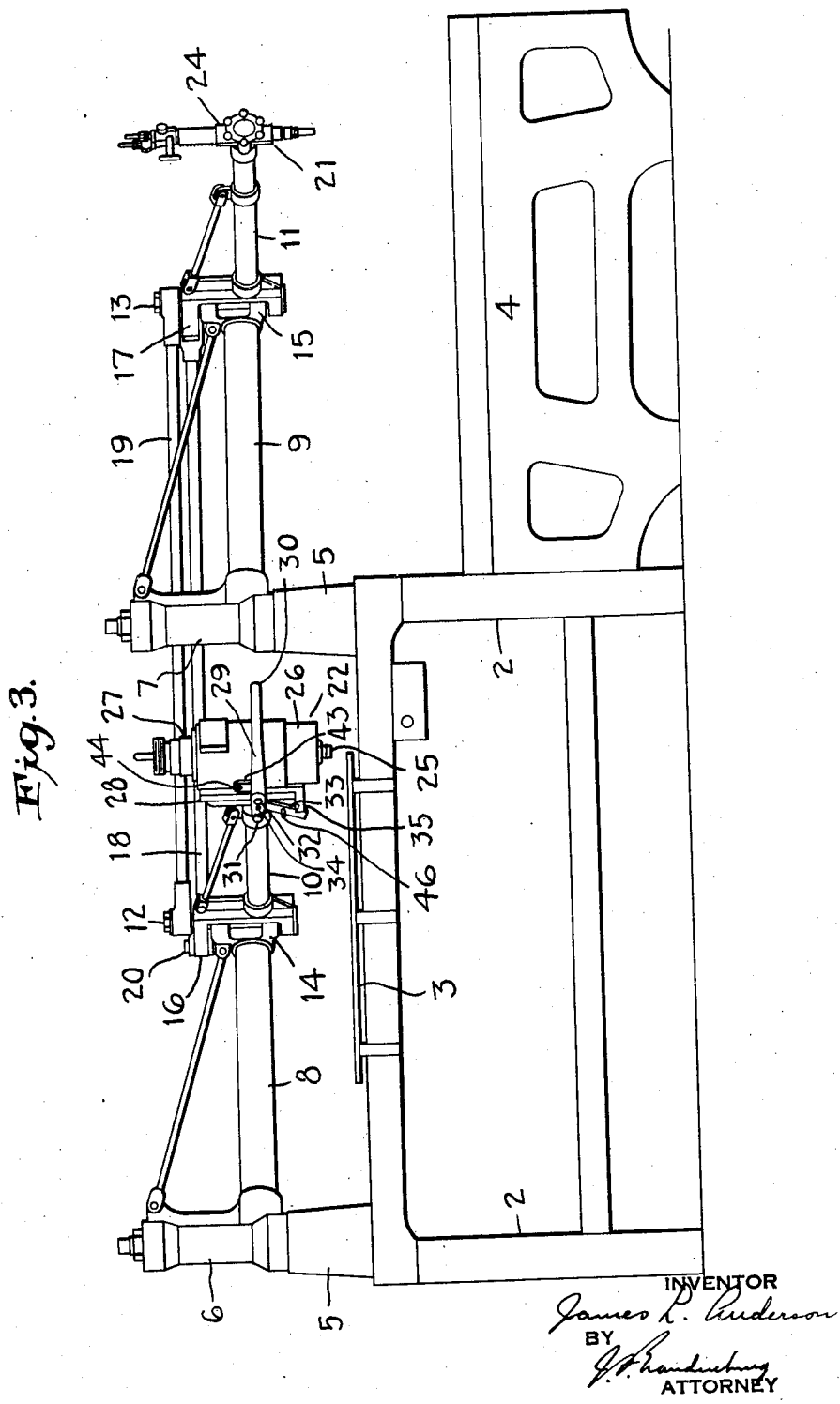

Patented Oct. 25, 1932

1,884,960

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

UNIVERSAL TORCH MACHINE

Application filed February 11, 1932. Serial No. 592,348.

The invention relates to improvements in motor-operated, pivotally jointed machines for cutting or welding metal in any desired and changing directions, from a drawing, template or pattern, by means of a thermal instrumentality, of which an illustration is an oxyacetylene or like torch, more particularly a cutting torch.

The object of the invention is to provide an accurate, free-moving, durable, and relatively simple machine, capable of executing irregular cuts or welds at even speed, without undue variation in load on the driver or excessive resistance at any point in the field of operation. Another object is to provide a machine which affords a relatively large and advantageous cutting or operating area by means of a construction which permits the machine to be made smaller or to occupy less space than other machines of the same general class.

Another object of the invention is to provide a machine, in which the extreme overhang of the linkage is substantially reduced, thereby reducing the tendency to sag and making it easier to produce a firm or substantially rigid machine. The machine is one in which the torch and the motor tracer are carried at regions which are separated from each other in a direction parallel with the work and in which the cut is executed in substantially one to one ratio to the pattern and in like directions of movement with the tracer.

There is a known type of machine having a base with two pivot posts, primary pivoted arms extending forward from the posts, secondary arms pivoted to the primary arms and extending forward from these, and two transverse links or bars connecting the arms so as to cause them to move in unison, the torch and tracer being carried by the front link or front bar.

Machines of the present invention differ from the former type of machine in one or more of the following particulars:

The primary arms are disposed to swing in arcs back of the fixed center line between the main pivots;

The torch and motor tracer are preferably carried on forwardly projecting ends of the secondary arms;

The secondary arms are preferably pivoted to the primary arms at points intermediate the ends of the secondary arms;

One or both of the transverse links are disposed behind the pivot posts;

One of the transverse links preferably connects rearward extensions of the secondary arms.

In the accompanying drawings forming part hereof:

Fig. 1 is a plan view of a cutting machine embodying the invention;

Fig. 2 is a plan view showing the torch and tracer in different positions of those of Fig. 1, the linkage being largely broken away because of lack of space; and Fig. 3 is a front elevation, the parts being shown in the positions corresponding to Fig. 1.

The machine has a suitable base structure 2 supporting a pattern or template table 3 and the mechanism. Supports 4 for the metal to be cut are shown adjoining one end of the base, the work support being in general longitudinal alinement with the pattern table.

Two parts 5, constituting main pivots, are carried by the base 2 at opposite sides or ends of the pattern support or surface. These stationary pivots, instead of being at a distance behind the pattern and work areas, as in former machines, are disposed within or adjacent the zone of these areas.

The hubs 6, 7 of two primary arms 8, 9 turn on the main pivots, and the construction is such that these arms swing in arcs back of the center line between the posts. In prior machines, to which reference has been made, the primary arms and the entire linkage extended and operated in front of the pivot posts.

Secondary arms 10, 11 are pivotally connected at 12, 13 to forwardly offset knuckles 14, 15 on the ends of the arms 8, 9. The arms 10, 11 extend forward from these pivots, but in the preferred embodiment of the invention, they also have rearward extensions 16, 17, so that these arms can be said to be pivoted intermediate their ends.

Means are provided to compel the arms 8, 9 to swing in unison with each other on the main pivots while keeping in parallelism, and for likewise obliging the arms 10, 11 to swing in parallelism and in unison with each other, relatively to the primary arms. Connections of different kinds may be used for this purpose, but preferably one or more transverse links or bars or employed.

Two such links, designated 18 and 19, are shown, the link 18 connecting the rearward extensions 16 and 17 of the secondary arms, to which extensions the ends of the link are pivoted at 20. The ends of the other link 19 are pivotally connected with the arms, preferably at the pivot joints 12 and 13. The transverse links may connect the arms at other points, but the construction shown is the most advantageous. It will be observed that in this embodiment the transverse links are behind the line of the pivot posts, with which they do not interfere in the operation of the linkage, whereas the torch 21 and the tracer 22 are in front of the line of main centers.

In the best embodiment of the invention the tracer support 23 is applied to the forward end of the arm 10, while the torch holder 24 is carried by the forward end of the arm 11, the arrangement being such that the torch and tracer occupy similar positions on these arms. In machines of the kind hitherto known, which may be termed the forwardly overhanging type, having all the linkage in front of the pivot posts, the torch and tracer were mounted on a front bar or link, on which they could be placed or adjusted at various positions lengthwise of the bar. Some similar manner of supporting the torch and tracer is not necessarily excluded as a modification of the present invention, but the mounting of the torch and tracer on free ends of the secondary arms affords advantages in a machine like the one illustrated herein.

In a construction such as illustrated in which the secondary arms have rearward extensions connected by a link, the working of the mechanism is improved by disposing these extensions at an obtuse angle to the forwardly extending parts of the arms.

The tracer is motor driven and may be either of a kind to cooperate with a template or of a kind having a manually guided tracer wheel to operate on a drawing. Various forms of both kinds of tracers are known. The tracer illustrated is of the electromagnetic type, having one or more magnetic rollers 25 to cooperate with the boundaries or edges of templates of paramagnetic material. The roller or rollers are magnetically energized by a coil in the portion 26 of the tracer, and driven from an electric motor 27 through gearing, not shown, housed within the tracer body. For further illustration of a tracer of this kind reference may be had to the Anderson and Rogers Patent 1,839,170, dated December 29, 1931.

The tracer body is engaged with a vertical guide 28 of the tracer support 23, so that the whole tracer can be raised and lowered, and so that it can float vertically in relation to the linkage of the machine. A further feature of the invention relates to simple and advantageous provisions for quickly lowering and raising the tracer unit, to and away from a template, and for sustaining it in an elevated position when the machine is not in action.

A lever 29 of the second order is preferably made in the form of a yoke to pass at opposite sides of the tracer body and with a hand-hold 30 at its outer end. The ends of the limbs of this lever are fulcrumed on pivots 31 on the sides of the tracer support, and intermediate their ends they are pivoted at 32 to links 43, which in turn are pivoted at 44 to the sides of the vertically movable tracer body. This affords a very convenient and safe way of raising and lowering the tracer.

To support the tracer in a lifted or inactive position a depending catch strut 33 is pivoted at 34 on one of the limbs of the lever 29, the lower end of this strut being adapted to engage a notch in a bracket 35 on the tracer support 23. When the tracer is lifted this strut will swing automatically by gravity, or could be swung by hand into engagement with the bracket, as the result of which the tracer is securely supported in this raised position. To lower the tracer to rest on the template, the operator grasps the lever with one hand and disengages the latch strut with the other. The strut may be provided with a handle projection 46 for greater convenience.

When the tracer rests on the template and the machine is in operation, it is desirable that the tracer be free to move vertically in relation to the universal movement frame, so that the tracer rests on the template by its weight, with uniform pressure neither augmented nor decreased by any vertical variation as between the tracer and the frame. When such relative movements occur the latch piece 33 merely slides on the end of the bracket 35, without any possibility of accidentally catching and holding the tracer up.

The electric cable 36 for supplying energy may pass through the arms 8 and 10. Similarly, the hose 37 for conducting gases to the torch may pass through the arms 9 and 11.

The general operation of the machine will be evident. The driven tracer follows, or is guided to follow, the pattern, and the linkage causes the torch to execute the same movements at a different region to make a cut of any contour in accordance with the pattern.

The relative compactness of the machine and the advantageous cutting or welding field that is provided will be apparent to those skilled in the art. Furthermore, it will be evident that the disposition of the linkage and the location of the items of weight in relation to the fixed center line between the posts is such that the parts of the jointed structure are more or less counterbalanced, and that even in a position such as shown in Fig. 2, with all the parts back of the posts, the overhang is comparatively short and much of the weight is kept close to the supports.

Since various changes and modifications may be made in the machine, the foregoing description is intended to be illustrative rather than limiting.

I claim:

1. A machine of the character described, comprising a base, two pivot supports thereon, parallel primary arms carried on said pivot supports so as to swing in arcs back of the fixed center line between said supports, a parallelogram of pivoted members pivotally connected with said primary arms, and a torch and a motor tracer on corresponding separated forward portions of said parallelogram.

2. A machine of the character described, comprising a base, two pivot supports thereon, parallel primary arms carried on said pivot supports so as to swing in arcs back of the line of fixed centers, parallel secondary arms pivoted to said primary arms and extending forward therefrom, a torch connected with the forward end of one of the secondary arms, a motor tracer connected with the forward end of the other secondary arm, and means interconnecting the arms so that like arms swing in unison with each other.

3. A machine of the character described, comprising a base, two pivot supports thereon, parallel primary arms carried on said pivot supports so as to swing in arcs back of the line of fixed centers, parallel secondary arms pivoted to said primary arms and extending forward therefrom, a torch connected with the forward end of one of the secondary arms, a motor tracer connected with the forward end of the other secondary arm, said secondary arms having rearward extensions, and two transverse links compelling like arms to swing in unison with each other, one of said links connecting said rearward extensions and both of said links being disposed behind the line of fixed centers.

4. A machine of the character described, comprising a base, two pivot supports thereon, parallel primary arms carried on said pivot supports so as to swing in arcs back of the line of fixed centers, parallel secondary arms pivoted to said primary arms and extending forward therefrom, a torch connected with the forward end of one of the secondary arms, a motor tracer connected with the forward end of the other secondary arm, said secondary arms having rearward extensions, a transverse link pivotally connecting said rearward extensions so as to compel the secondary arms to swing in unison with each other relatively to the primary arms, and another transverse link compelling the primary arms to swing in unison with each other.

5. A machine of the character described, comprising a base, two pivot supports thereon, parallel primary arms carried on said pivot supports so as to swing in arcs back of the line of fixed centers, parallel secondary arms pivoted to said primary arms and extending forward therefrom, a torch connected with the forward end of one of the secondary arms, a motor tracer connected with the forward end of the other secondary arm, said secondary arms having rearward extensions, a transverse link pivotally connecting said rearward extensions so as to compel the secondary arms to swing in unison with each other relatively to the primary arms, and means interconnecting the primary arms and compelling them to swing in unison with each other.

6. A machine of the character described, comprising a base, two pivot supports thereon, parallel primary arms carried on said pivot supports so as to swing in arcs back of the line of fixed centers, parallel secondary arms pivoted to said primary arms and extending forward therefrom, a torch connected with the forward end of one of the secondary arms, a motor tracer connected with the forward end of the other secondary arm, a transverse link compelling said primary arms to swing in unison with each other, and means compelling said secondary arms to swing in unison with each other relatively to the primary arms.

7. A machine of the character described, comprising two pivot supports, parallel primary arms swung on said supports, a torch arm pivotally connected intermediate its ends with one of said primary arms, a tracer arm pivotally connected intermediate its ends with the other primary arm, said torch and tracer arms having the torch and tracer at their forward portions, and two transverse links pivotally interconnecting said primary arms and said torch and tracer arms so that the members of each pair of arms move in unison with each other, the rearward of said links connecting the rear portions of said torch and tracer arms back of the centers on which said arms turn relatively to the primary arms.

8. A machine of the character described, comprising two pivot supports, parallel primary arms swung on said supports, a torch arm pivotally connected intermediate its ends with one of said primary arms, a tracer arm pivotally connected intermediate its ends with the other primary arm, said torch and tracer arms having the torch and tracer at their forward portions, a transverse link pivotally connecting the rearwardly extending portions of said torch and tracer arms, and another transverse link pivoted at the centers on which said arms turn relatively to the primary arms.

9. A machine of the character described, comprising two pivot posts, parallel primary arms swung on said posts, parallel secondary arms pivotally connected intermediate their ends with said primary arms, a torch and a tracer on the forward ends, respectively, of said secondary arms, and two transverse links pivotally interconnecting the arms so that the members of each pair of arms move in unison with each other, said links being disposed behind the pivot posts.

10. A machine of the character described, comprising a base, two pivot posts thereon, two parallel primary arms carried on said posts to swing in arcs back of the fixed center line between the posts, means including parallel secondary arms pivoted to the primary arms and extending forward therefrom, said means carrying a motor tracer and a torch at corresponding spaced forward portions, and transverse elements compelling the primary arms to swing in unison with each other and the secondary arms to swing in unison with each other relatively to the primary arms.

11. A machine of the character described, comprising a base, two pivot supports thereon, two primary arms swung on said supports so as to move in arcs back of the line of fixed centers, two secondary arms pivoted to said primary arms and extending forward therefrom, said secondary arms having rearward extensions disposed at obtuse angles to the forward parts of the same arms, a transverse link connecting said rearward extensions so that these arms swing in unison, and additional means for also compelling the primary arms to swing in unison.

12. In a machine of the character described having a frame for reproducing universal movement in a plane, a motor-driven tracer vertically guided on said frame, and a lever of the second order fulcrumed on said frame and connected with said tracer for raising and lowering the same.

13. In a machine of the character described having a frame for reproducing universal movement in a plane, a motor-driven tracer vertically guided on said frame, a lever of the second order fulcrumed on said frame and connected with said tracer for raising and lowering the same, and a catch for sustaining the tracer in an elevated position.

14. In a machine of the character described having a frame for reproducing universal movement in a plane, a motor-driven tracer vertically guided on said frame, a lever of the second order fulcrumed on said frame and connected with said tracer for raising and lowering the same, an automatic catch piece pivoted on the lever, and a support on the frame adapted to be engaged by said catch piece.

15. In a machine of the character described having a frame for reproducing universal movement in a plane, a motor-driven tracer vertically guided on said frame, and a lever of the second order fulcrumed on said frame and connected with said tracer for raising and lowering the same, said lever being in the nature of a yoke having limbs passing at opposite sides of the tracer and connected therewith and with the frame.

JAMES L. ANDERSON.